(12) United States Patent
Chapman et al.

(10) Patent No.: US 6,688,097 B2
(45) Date of Patent: Feb. 10, 2004

(54) MULTIVARIANT SET POINT USING $N_1$ AND $N_2$ FOR ENGINE CONTROL

(75) Inventors: Gregory J. Chapman, Scottsdale, AZ (US); John J. Rushinsky, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 132 days.

(21) Appl. No.: 10/027,575

(22) Filed: Dec. 19, 2001

(65) Prior Publication Data

US 2003/0110759 A1 Jun. 19, 2003

(51) Int. Cl.⁷ .............................. F02C 9/28; F02K 3/04
(52) U.S. Cl. ....................... 60/226.1; 60/243; 60/39.281
(58) Field of Search ................... 60/39.281, 226.1, 60/243, 792

(56) References Cited

U.S. PATENT DOCUMENTS

| | | |
|---|---|---|
| 3,639,076 A | 2/1972 | Rowen |
| 3,854,287 A * | 12/1974 | Rembold ................ 60/792 |
| 3,971,208 A | 7/1976 | Schwent ................ 60/39.03 |
| 4,184,327 A | 1/1980 | Cornett et al. ............... 60/240 |
| 4,242,864 A | 1/1981 | Cornett et al. |
| 4,258,545 A | 3/1981 | Slater ................... 60/226 R |
| 4,296,601 A | 10/1981 | Martin |
| 4,422,289 A | 12/1983 | Langton ............... 60/39.281 |
| 4,551,972 A | 11/1985 | Lewis ................... 60/39.281 |
| 4,651,518 A | 3/1987 | McLaughlin et al. |
| 4,912,642 A | 3/1990 | Larsen et al. |
| 5,067,080 A | 11/1991 | Farman |
| 5,107,674 A | 4/1992 | Wibbelsman et al. |
| 5,224,340 A | 7/1993 | Snow |
| 5,303,545 A * | 4/1994 | Larkin ................... 60/39.281 |
| 5,394,689 A | 3/1995 | D'Onofrio |
| 5,761,895 A | 6/1998 | Chu et al. |
| 6,000,215 A | 12/1999 | Roberts, Jr. |
| 6,282,884 B1 | 9/2001 | Adibhatla et al. ........ 60/39.281 |

FOREIGN PATENT DOCUMENTS

EP  0 277 904 A2  8/1988

OTHER PUBLICATIONS

PCT International Search Report, filed Dec. 5, 2002, European Patent Office.

\* cited by examiner

Primary Examiner—Louis J. Casaregola
(74) Attorney, Agent, or Firm—Robert Desmond, Esq.

(57) ABSTRACT

A turbofan engine throttle control system and method for eliminating dead bands in the throttle control by decreasing and increasing the fuel flow to the engine during transition from the scheduled core speed to scheduled fan speed of the engine to effect a smooth and continuous transition from the core speed to the fan speed and vice-versa. A signal is generated to open and close a valve system to augment and decrease the fuel flow in response to sensing different throttle lever angles.

4 Claims, 2 Drawing Sheets

MULTIVARIANT SET POINT USING $N_1$ AND $N_2$ FOR ENGINE CONTROL

BACKGROUND OF THE INVENTION

This invention relates to a throttle control for an aircraft turbofan engine, and more particularly to a throttle control, which eliminates dead band in the throttle control.

Typically, two different power setting parameters are used to control the speed of operation of a turbofan engine. These are fan speed at high power setting and engine core speed at idle. Historically, the transition to fan speed from core speed causes a dead band or slippage in the throttle response. The dead band is different for each engine due to the variation in engine hardware and control sensors.

The disclosure in U.S. Pat. No. 4,296,601 seeks to address this problem by controlling a combined engine speed parameter. The combined speed parameter is comprised of core speed and fan speed. The combined parameter is correlated with power lever or throttle position so as to control fuel flow to the engine at variant power level requirements.

As indicated, many turbofan engines with electronic engine controls use fan speed as the power setting parameter for high power operation. Climb and takeoff power settings are examples of high power operation. However, at idle the same engine may use core (also known as HP shaft) speed as the power setting parameter. Typically, an equivalent idle power set fan speed is estimated for the core idle speed. The idle fan speed and the climb power setting fan provide end points for the engine throttle.

There is variability in the engine control sensors and from one engine's hardware to the next. Consequently, the estimated speed for idle may only be representative of a small number of engines. When operating at the estimated fan speed for idle some engines may have a core speed higher than the power setting core speed. To ensure all engines obtain the power setting core speed, the power set fan speed for idle is lowered below the estimated value. The lowering of the power set fan speed will ensure the engine transitions on to the core speed idle governor. However, this approach to transition from fan speed to core speed power setting often causes dead bands in the engine throttle movement.

The size of the dead band will vary depending on the individual engine characteristics. Consequently, on multi-engined aircraft the throttle for each engine will likely have a different dead band and could change as engines are replaced as part of normal maintenance.

As can be seen, there is a need for an apparatus and method to provide smooth transition from fan speed to core speed control, eliminating the throttle dead band. An apparatus and method is also needed that is stable dynamically and always ensures a flat or increased fan speed with increasing throttle position A further need is for engine throttle position or movement to result in a commanded fuel flow. Also needed is an apparatus and method that varies fuel flow to obtain a desired fan speed or idle core speed or set points there between to eliminate the dead band. Yet another need is for an apparatus and method that transitions from one controlling parameter to an entirely different controlling parameter and performs a selection between the various parameters to define the final control parameter to attack the direct cause of dead bands in throttle control of turbofan engines, such as by monitoring fuel flow to the engine to eliminate any dead band intervals

SUMMARY OF THE INVENTION

In accordance with the present invention, a turbofan engine control system and method for eliminating dead bands in the throttle control decreases and increases the fuel flow to the engine during transition from the scheduled core speed to the scheduled fan speed of the engine to effect a smooth and continuous transition from the core speed to the fan speed and vice-versa. This is effected by generating a signal to a control unit to open and close a valve system to augment and/or decrease the fuel flow in response to sensing different throttle lever angles of the throttle in the control system.

In one aspect of the present invention a throttle lever for controlling engine speed is provided along with a fuel section for providing fuel flow to the engine at different throttle lever angles in proportion to the throttle lever angle, with the fuel section including a control mechanism for augmenting and decreasing the fuel flow in response to a fuel flow modifying electrical signal and a signal processing circuit for providing the fuel flow modifying signal in response to sensing different throttle lever angles representing a combination of the fan and core idle speed scheduling.

In another aspect of the invention, the signal processing circuit provides a signal which achieves a smooth and continuous transition from the core speed to the fan speed scheduling to eliminate any dead bands in the throttle lever angle.

In yet another aspect of the invention, a plurality of turbofan engines can be controlled by the system of the invention by providing a separate throttle lever for controlling engine speed of each engine, a fuel section, and a signal processing circuit for providing a fuel flow modifying electrical signal to the fuel section in response to sensing the different throttle lever angles associated with each engine representative of the combination of fan and core idle speed scheduling of each engine.

These and other features, aspects and advantages of the present invention will become better understood with reference to the following drawings, description and claims.

DETAILED DESCRIPTION OF THE INVENTION

The following detailed description is of the best currently contemplated modes of carrying out the present invention. The description is not to be taken in a limiting sense, but is made merely for the purpose of illustrating the general principles of the invention, since the scope of the invention is best defined by the appended claims.

Figure 1:
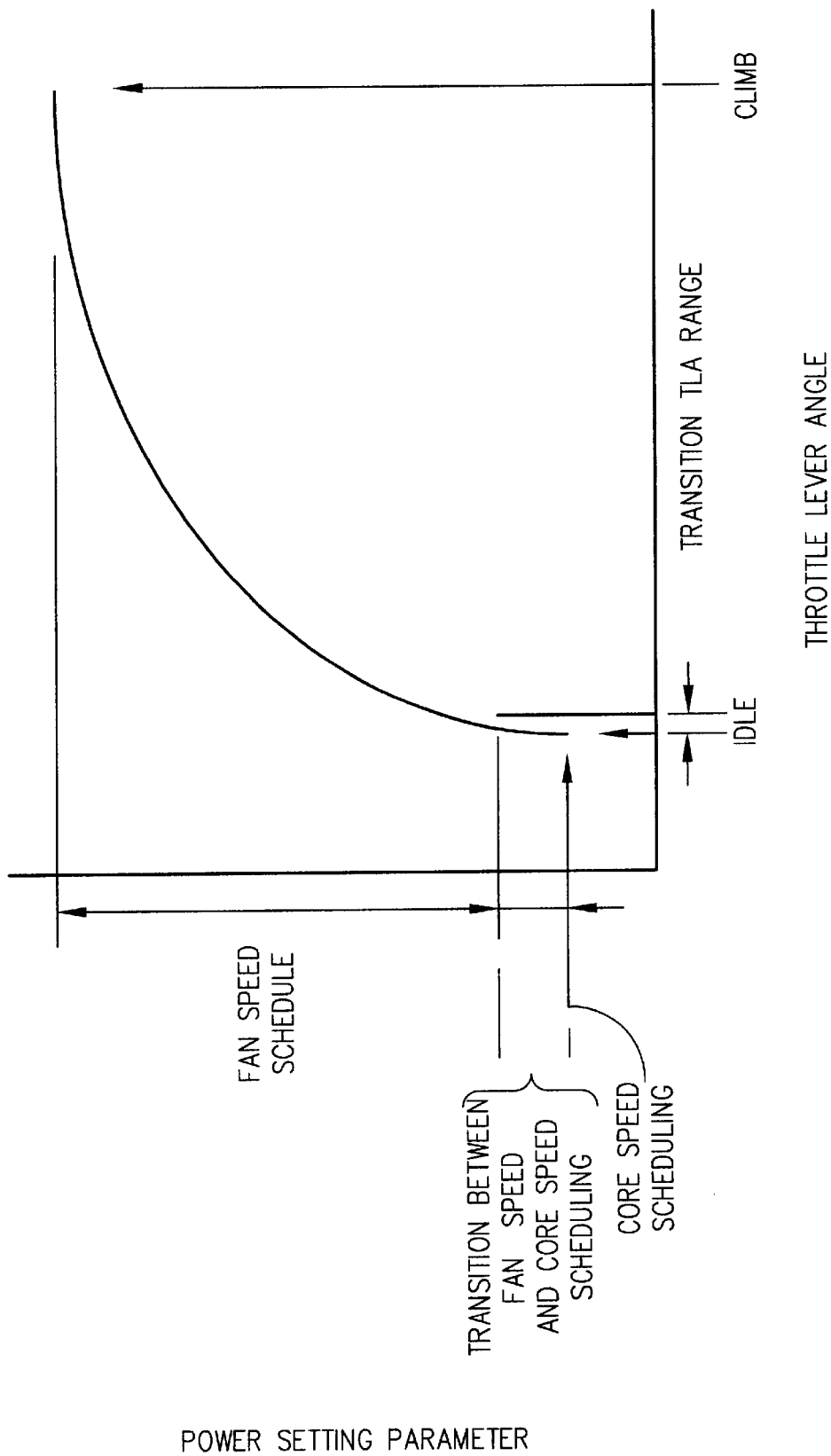
FIG. 1 is a graph of the desired power setting behavior correlated to throttle lever angle accomplished by the present invention.

Referring now to the drawings in detail, and particularly FIG. 1, the desired power setting behavior versus throttle lever angle (TLA) is depicted. For the majority of the throttle lever angle (TLA) range, the fan speed of the turbofan engine is the controlling parameter. At idle, the control parameter is the core speed of the turbofan engine. As indicated, there is to be a small region where a transition between fan speed and core speed control occurs; but all dead bands are eliminated by controlling fuel flow to the engine under the following protocol:

The change in fan speed for a fuel slow change is called the fuel flow gain for fan speed ($Kwf_{fan}$). The change in core speed for a fuel flow change is called the fuel flow gain for core speed ($Kwf_{core}$).

If the current fan speed is different from the desired (or power setting) fan speed, the required change is fuel is estimated by:

$$WF_{new} - Wf_{old} = Kwf_{fan}(N_{fanschedule} - N_{fan}) \quad (1)$$

Likewise, if the current core speed is different from the desired (or power setting) core speed, the required change in fuel is estimated by:

$$Wf_{new} - Wf_{old} = Kwf_{core}(N_{coreschedule} - N_{core}) \quad (2)$$

where $Wf_{old}$ and $Wf_{new}$ are the old (or current) and new fuel flow rates, respectively.

In the region of fan speed scheduling as depicted in FIG. 1, the engine fuel flow may be adjusted so that the engine fan speed equals the fan speed schedule:

$$N_{fan} = N_{fanschedule}$$

The transition from core speed scheduling to fan speed scheduling may be accomplished as follows:

$$N_{fan}K_{pla} + N_{core}(1-K_{pla}) = N_{fanschedule}*K_{pla} + N_{coreschedule}*(1-K_{pla}) \quad (3)$$

where $K_{pla}$ is 0 at idle TLA and increases to 1.0 at $$TLA = (\text{idle } TLA) + (\text{Transition } TLA \text{ Range}) \quad (4)$$

The more complete form of equation (3) is obtained using equation (1) and (2) above to give:

$$Wf_{new} = Wf_{old} + Kwf_{fan}(N_{fanschedule} - N_{fan})K_{pla} + Kwf_{core}(N_{coreschedule} - N_{core})(1-K_{pla}) \quad (5)$$

Equation 5 accounts for the dynamic effects of adjusting fuel flow with fan and core speed while achieving a smooth and continuous transition from fan speed to core speed scheduling.

Figure 2:
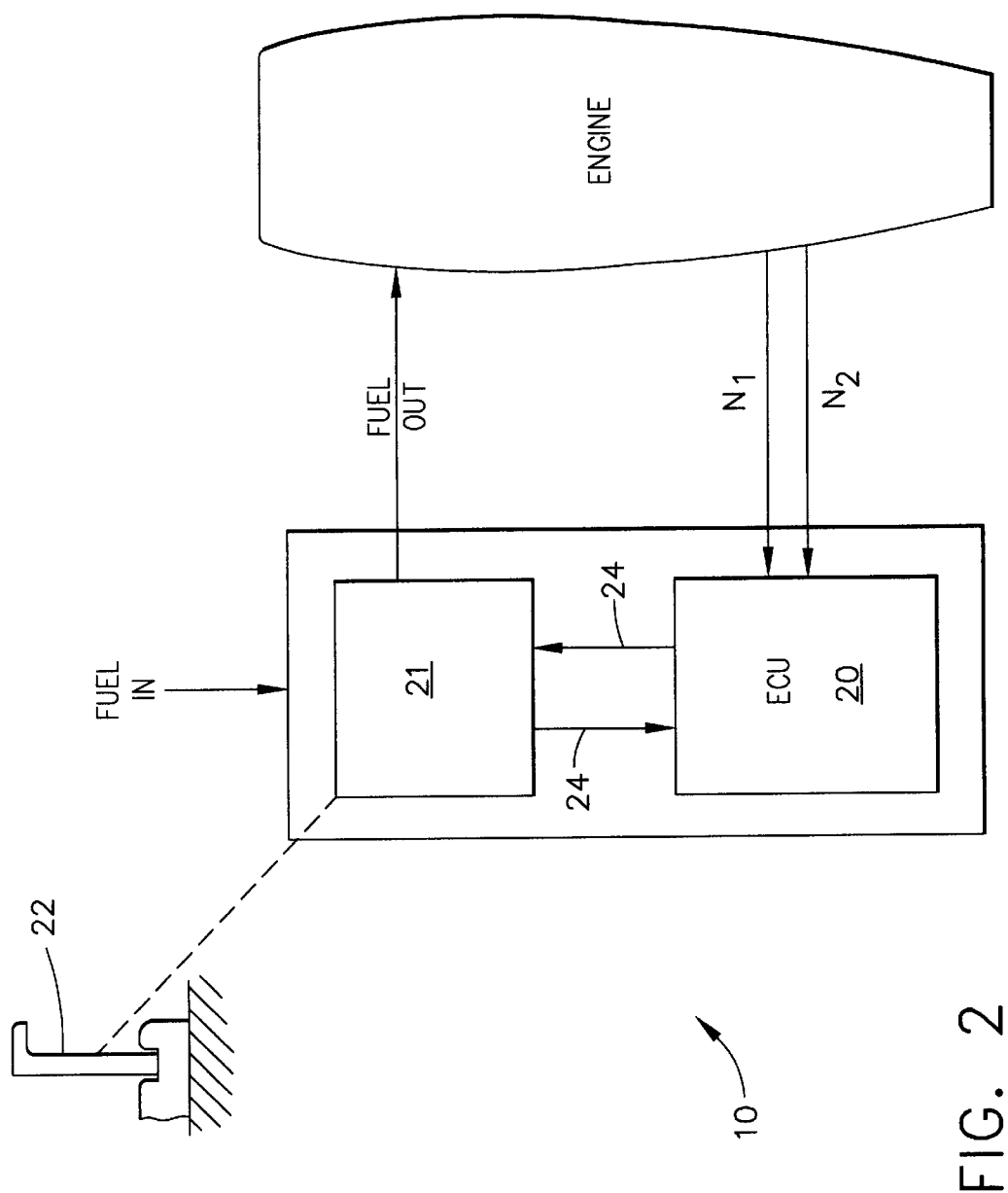
FIG. 2 is a schematic block diagram illustrating a system for implementing the present invention.

FIG. 2 shows a schematic block diagram of a fuel control system 10 for implementing the invention. This system includes an electronic computation unit (ECU) 20 which monitors the various engine operating parameters so as to control the operation of the fuel control to modify the fuel applied to the engine. The ECU 20 can modify flow in response to the engine parameters. Fuel can be supplied to a fuel pump, not shown. The fuel can flow through a line from the pump to a regulating valve assembly and then through another line to a power lever valve, which can be connected to the power throttle 22 (lines and valves are not shown), as they are well known to one of ordinary skill in the art. The power lever valve can be connected to a potentiometer which can be used to supply an electronic signal to the ECU 20. The signal can indicate the power lever position of the pump and regulating valve arrangement which are standard and not shown, but are indicated schematically at 21.

Included in the fuel control system 10 may be an electric torque motor (not shown) which may receive electrical signals from the ECU 20 over line 24. In response to these signals, the torque motor can open a flapper valve which is normally closed in the absence of a signal. As mentioned in an earlier portion of this description, the ECU and torque motor can provide an electrical interface to the hydromechanical fuel control to provide proper fuel ration units to the engine in relation to power lever movement. The ECU may be programmed to such parameters as $N_{core}$, $N_{fan}$, $N_{fanschedule}$, $N_{coreschedule}$, designated $N_1$, and $N_2$ in FIG. 2, and calculate the $Wf_{new}$ of the equation (5), until the correct ratio units are achieved for the engine at any operating condition. The ECU may accomplish this by applying a correction signal to the torque motor to modify the fuel flow produced by the hydromechanical portion in order to achieve the precise ratio units.

As indicated, the present system disclosed can utilize a combination of core idle speed and fan speed as the parameters to ration the fuel flow to the engine to effect a smooth and continuous transition from one to the other, rather than relying on but one parameter, such as engine fan speed, to eliminate dead bands in the throttle angle.

It should be understood, of course, that the foregoing relates to preferred embodiments of the invention and that modifications may be made without departing from the spirit and scope of the invention. Any such modifications should in no way limit the scope of the invention, which should only be determined based on the following claims.

We claim:

1. A throttle control system for a turbofan engine having a fan speed and a core idle speed schedule comprising:
    a throttle lever for controlling engine speed,
    a fuel section for providing fuel flow to the engine at different throttle lever angles in proportion to the throttle lever angle, said fuel section including:
        a control mechanism for decreasing and augmenting said fuel flow in response to a fuel flow modifying electrical signal, and
        a signal processing circuit for providing said fuel flow modifying signal in response to sensing different throttle lever angles representing a combination of said fan and core idle speed scheduling,
        wherein said signal processing circuit signal provides a signal which reflects the transition from said core idle speed scheduling to said fan speed scheduling.

2. The throttle control system of claim 1 wherein said signal processing circuit provides a signal which achieves a smooth and continuous transition from core speed to fan speed scheduling to eliminate any dead bands in said throttle lever angle.

3. A throttle control system for a turbofan engine having a fan speed and a core idle speed schedule comprising:
    a throttle lever for controlling engine speed,
    a fuel section for providing fuel flow to the engine at different throttle lever angles in proportion to the throttle lever angle, said fuel section including:
        a control mechanism for decreasing and augmenting said fuel flow in response to a fuel flow modifying electrical signal, and
        a signal processing circuit for providing said fuel flow modifying signal in response to sensing different throttle lever angles representing a combination of said fan and core idle speed scheduling
        said signal processing circuit providing a signal which achieves a smooth and continuous transition from core speed to fan speed scheduling to eliminate any dead bands in said throttle lever angle.

4. The throttle control system of claim 3 wherein said signal processing circuit provides a signal which reflects the transition from said core idle speed scheduling to said fan speed scheduling.

* * * * *